OR  3,689,129

United States
Lurie

[15] 3,689,129
[45] Sept. 5, 1972

[54] HIGH RESOLUTION, REDUNDANT COHERENT WAVE IMAGING APPARATUS EMPLOYING PINHOLE ARRAY

[72] Inventor: Michael Jay Lurie, 27-Salem Road, East Brunswick, N.J. 08816
[22] Filed: April 14, 1971
[21] Appl. No.: 133,807

[52] U.S. Cl. ............................350/3.5, 350/162 SF
[51] Int. Cl. ............................................G02b 27/22
[58] Field of Search.........................................350/3.5

[56] References Cited
UNITED STATES PATENTS
3,582,177  1/1971  Kiemle .....................350/3.5

Primary Examiner—David Schonberg
Assistant Examiner—Robert L. Sherman
Attorney—Edward J. Norton

[57] ABSTRACT

By properly selecting the distance between a non-scattering object and a matrix of point sources through which the object is illuminated with coherent wave energy, a pinhole array which in itself is capable of providing high redundancy only with low resolution may be made to provide both high redundancy and high resolution. Such apparatus is particularly suitable for recording holograms from transparencies.

18 Claims, 4 Drawing Figures

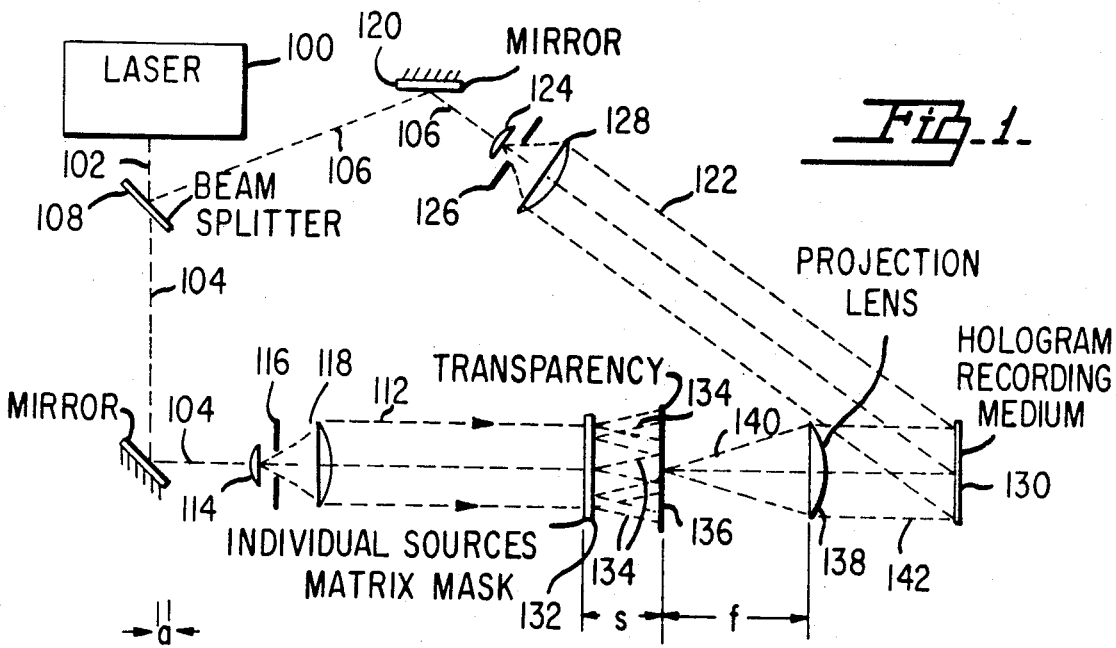
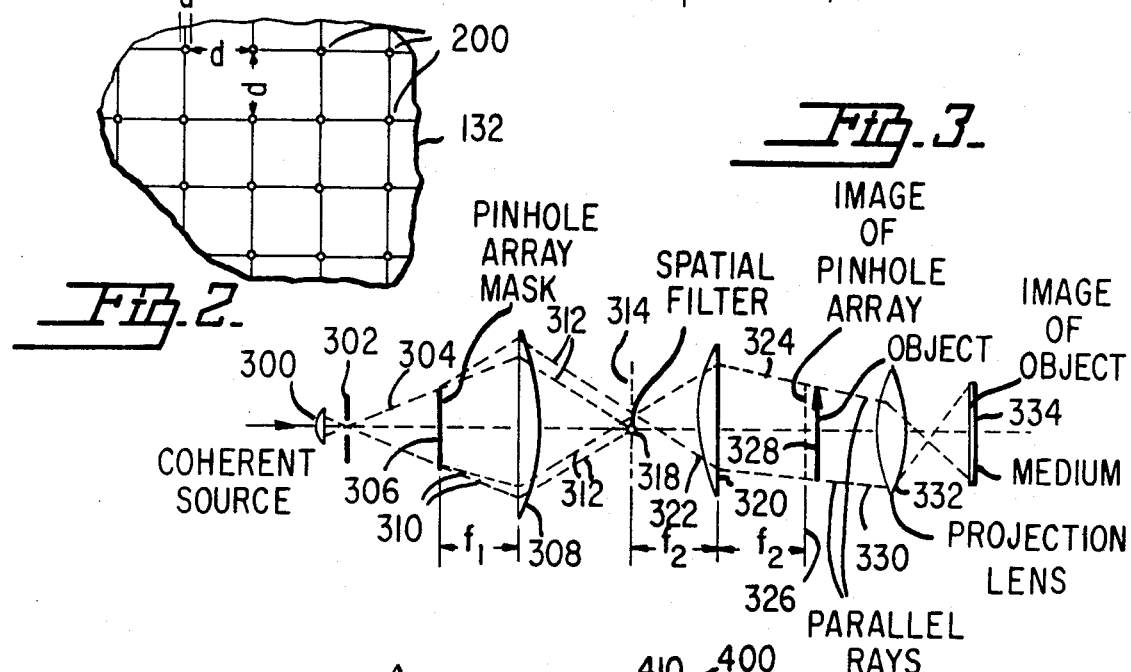
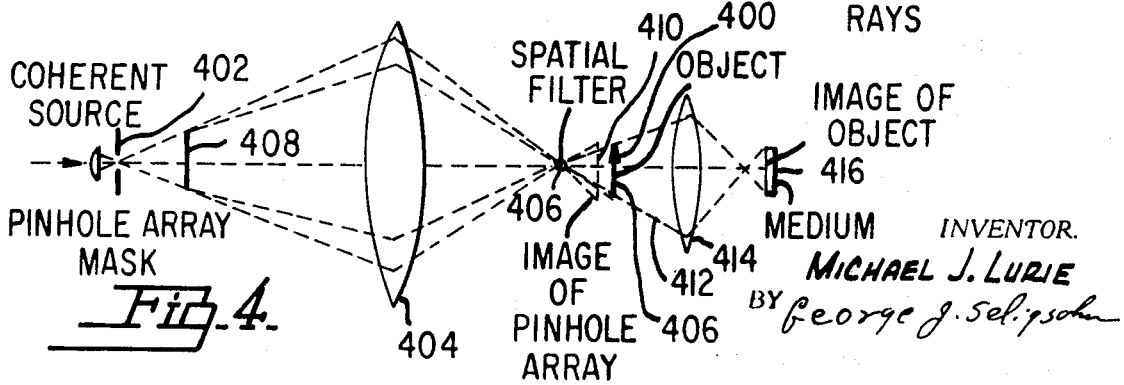
INVENTOR.
MICHAEL J. LURIE
BY George J. Seligsohn
ATTORNEY

HIGH RESOLUTION, REDUNDANT COHERENT WAVE IMAGING APPARATUS EMPLOYING PINHOLE ARRAY

This invention relates to coherent wave energy images of objects and, more particularly, to improved techniques for projecting redundant coherent wave energy images of a non-scattering object.

The present invention, although not limited thereto, is well suited for the recording of holograms. Hologram recording, as known in the art, consists of exposing an area of a recording medium, such as a photographic film or photoresist, to an information beam from an object illuminated with spatially coherent electromagnetic waves, such as laser light, and simultaneously directly exposing the same given area to a reference beam of the aforesaid spatially coherent electromagnetic waves. This results in an interference pattern formed by the information beam and the reference beam being recorded on the given area of the recording medium.

Where the illuminated object is a transparency, such as a photographic slide or a frame of a motion picture, any scratches or dirt spots present on the recording medium, upon reconstruction of an image from a recorded hologram, will cause complete loss of small portions of the image when no redundancy is provided in the information beam during the recording of the hologram. (In addition to a transparency, this is also true of other types of non-scattering objects, such as specularly reflecting objects.) However, if sufficient redundancy is provided in the information beam during the recording of the hologram, the recorded hologram can be severely scratched, spotted with dirt, and even broken into pieces without causing more than a slight loss in overall resolution and contrast in the reproduced image. Usually a slight overall degradation in the reproduced image is preferable to a complete loss of small portions of the image. For this reason, redundant holograms are attractive for data recording and display applications.

In the prior art, one way of obtaining this desired redundancy is achieved by utilizing an information beam composed of diffused light in recording the hologram. More specifically, it is a practice to pass a beam of spatially coherent light through a plate of diffusing glass, such as opal glass, prior to shining it through a transparency having thereon information to be recorded. This results in each point of the given area of the recording medium being illuminated with light from all points on the transparency, as well as with the light from the reference beam. Therefore, a high degree of redundancy is achieved on the recorded hologram. On the other hand, if the diffusing glass is eliminated, light in the information beam reaching any particular point of a given area of the recording medium is obtained from solely a corresponding particular single point of the transparency, the correspondence being on a one-to-one basis. In this latter case no redundancy is present in the recorded hologram and any slight scratch or dirt spot on the hologram recording causes a complete loss of a specific small portion of the reproduced image.

Unfortunately, there is a price which must be paid for the scratch immunity afforded by diffused holograms. The price is paid either in accepting background noise, including "speckle", or using very large holograms that are not affected by speckle noise.

Speckle noise is a by-product of highly coherent light, such as lasar radiation, when it is diffusely reflected. The bright speckles correspond to the constructive interference of the diffusely reflected light while the dark speckles correspond to the destructive interference. Since a diffuse reflecting surface has completely random characteristics, the observed speckle noise also has random characteristics. The appearance of speckle noise in a reproduced hologram is similar to that of grain noise found in a photographic image or print.

A good approximation of the signal-to-speckle noise power ratio of a diffused hologram is given by the ratio of the area of the smallest spot diameter that can be reproduced from a hologram considering the entire recording and reproducing system and the smallest spot diameter that can be reproduced from a hologram taking into consideration only the diffraction limit.

Since a large hologram has a very small diffraction limit, while a small hologram has a relatively large diffraction limit, speckle noise is much more apparent in small holograms than it is in large holograms. However, to obtain a high information packing density in the recording of holograms, just as in the case of recording conventional microfilms, it is most desirable to make the area of a hologram recording quite small (having dimensions in the order of one-fourth inch or less, by way of example).

On one hand, it will be seen that a small scratch or dirt spot on such a small hologram recording without redundancy can be tolerated to a much less extent than such scratches or dirt spots on a large-size hologram recording. On the other hand, the recording of redundant small holograms by the use of a conventional diffused information beam results in a large amount of undesired speckle noise being present in the reproduced image.

In accordance with the teaching of the copending patent application Ser. No. 29,748, filed Apr. 24, 1970 by Hannan et al., and assigned to the same assignee as the present application, a redundant, speckle-free hologram recording may be achieved by substituting for the conventional diffuser an information redundancy means which produces a plurality of discrete, angularly spaced, overlapping information beams, the spacing of these overlapping beams being sufficiently small to cause the maximum spatial wavelength in any noise interference pattern resulting from the presence of the redundancy means to be no greater than the ultimate resolution limit with which an image of the recorded object is capable of being reconstructed from the recorded hologram.

In practice, the co-pending application suggests that devices, such as a two-dimensional phase grating having an appropriate line spacing, or a combination of beam splitters and/or mirrors, or an optical tunnel may be employed to obtain the required plurality of angularly-spaced, overlapping information beams.

The amount of redundancy obtainable depends both upon the total number of information beams which, in whole or in part, illuminate the area of the recording medium on which the hologram is recorded, and the fraction of each of these beams which actually illuminates this area. In the case of the two-dimensional phase grating, the number of useful beams that can be generated is limited by the form of the phase grating, and is typically nine.

By using a combination of beam splitters and/or mirrors to generate the plurality of required angularly spaced, overlapping information beams, it is theoretically possible to increase the number of information beams and, hence, the resulting redundancy as high as desired. However, in practice the actual number of information beams is severly limited. This is true because both the number of elements in the combination of beam splitters and/or mirrors needed to generate any given number of required angularly displaced overlapping information beams, as well as the complexity of arrangement of these elements, increases at a faster rate than the size of the given number of beams to be generated. Thus, practically speaking, the maximum redundancy obtainable by the use of such a combination of beam splitters and/or mirrors is only somewhat larger than that obtainable with a two-dimensional phase grating, and even then the required complexity of the redundancy means is a disadvantage. Also, the size of the hologram increases with increasing number of information beams.

The present invention is directed to a technique which permits a large amount of redundancy to be obtained, while at the same time still being capable of preventing the recording of any noise interference pattern which can be resolved. Although it is particularly suitable for the recording of holograms, the present invention is useful for all types of projection of redundant coherent wave energy images of a non-scattering object. Furthermore, simple redundancy means are employed in the present invention, which makes it very practical.

Briefly, the present invention is directed to apparatus employing coherent wave energy to illuminate a non-scattering object and to project with a given resolution limit and a given redundancy object information obtained thereby on a given area of a medium. Such apparatus may comprise first means including a wave diffracting member responsive to illumination thereof by an applied given wavefront of coherent wave energy of a preselected wavelength for simultaneously deriving a predetermined matrix of a given number of individual sources of the coherent wave energy arranged in a first given pattern, such as from a pinhole array. The first given pattern has at least a minimum spacing between any pair of adjacent sources, the minimum spacing being chosen to limit the diffraction by the matrix to an amount which provides an inherent redundancy capability at least equal to the given redundancy. Unfortunately, this minimum spacing results in the inherent resolution capability of the matrix itself being degraded. Thus, the desired redundancy and resolution requirements of the apparatus tend to be antagonistic to each other.

The present invention solves this problem by taking advantage of the fact that the coherent energy emanating from each respective one of the individual sources, in response to illumination of the diffraction member by a given wavefront of coherent energy, interferes with the coherent wave energy emanating from others of the individual sources. This provides a spatial distribution of first regions of relative constructive interference. The density of any local grouping of first regions in the distribution is a function of the given wavefront and preselected wavelength of the coherent wave energy, and of the number and arrangement of the individual sources in the pattern defined by the matrix. Further, the location of any local grouping with respect to the matrix also affects the density of first regions therein. By locating the object in a given spaced relationship with respect to the matrix which is selected to illuminate the object with the coherent wave energy of at least some of the first regions of only a particular local grouping, it is possible to obtain both the required redundancy and the required resolution. This is accomplished by selecting the particular local grouping so that the first regions thereof are arranged in a second pattern characterized by having a given density such that the spacing between any pair of adjacent ones of the first region of this particular local grouping is sufficiently smaller than the minimum spacing of the sources of the first pattern to result in the object being sampled by coherent energy of the particular group with a resolution at least adequate for the given resolution limit. The coherent energy of each first region of the particular local grouping illuminating the object is modulated by that sample portion of the object which it illuminates. The particular local grouping is such that any noise interference pattern portion of the second pattern projected on the object, which is due to constructive and destructive interference among the sources of the wave diffracting member, has no spatial frequency components below the given resolution limit. The object information may then be projected with a given resolution limit and a given redundancy on the given area of the medium by providing second means including the medium arranged to illuminate the medium within the given area thereof simultaneously with at least part of each of a given plurality of the diffraction orders of the modulated coherent wave energy emanating from each respective sample portion of the object. This given plurality is sufficient to provide the given redundancy.

Other features and advantages of the present invention will become apparent from the following detailed description taken together with the accompanying drawing, in which:

FIG. 1 illustrates in diagrammatic form a first embodiment of the present invention for recording a hologram;

FIG. 2 is a fragmentary showing of the details of a type of individual sources matrix mask which may be employed in the embodiment of FIG. 1;

FIG. 3 illustrates in diagrammatic form another embodiment of the present invention, and FIG. 4 illustrates in diagrammtic form a still other embodiment of the present invention.

Referring to FIG. 1, there is shown laser 100, which emits beam 102 of coherent wave energy at a certain wavelength, $\lambda$. Beam 102 is split into first component 104 and second component 106 by beam splitter 108, which may be a partially reflecting mirror. Beam 104, after reflection by mirror 110 is enlarged into parallel beam 112 by a beam enlarger comprising convex lens 114, pinhole plate 116 and collimating lens 118. In a similar manner, second component beam 106, after reflection by mirror 120, is enlarged into parallel reference beam 122 by a beam enlarger comprising convex lens 124, pinhole plate 126, and collimating lens 128. As shown, reference beam 122 is incident on the recording surface of holographic recording medium 130 at some predetermined angle with respect thereto. Medium 130, which may be a photographic film or a photoresist, for instance, is sensitive to the intensity of wave energy from laser 100 arriving at any point thereof. Medium 130 may have only a certain ultimate resolution capability which is adequate to record information with a required resolution but which prevents short spatial wavelength noise interference patterns from being resolved.

Parallel beam 112, which has a plane wavefront, is incident on individual sources matrix mask 132, which is shown in more detail in the fragmentary view of FIG. 2. As shown in FIG. 2, individual sources matrix mask 132 comprises an array of spaced pinholes 200 arranged in a predetermined pattern. As shown, the predetermined pattern is square with each pinhole being circular and having a diameter $a$ and the distance between the centers of adjacent holes being $d$. However, the predetermined pattern need not be square and the respective pinholes themselves may have other shapes than circular, such as elliptical, rectangular or square, for instance. Individual sources matrix mask 132 constitutes a diffraction member whose diffracting properties depend upon the size of the dimensions, such as $a$ of each respective pinhole and the distance $d$ between adjacent pinholes relative to the wavelength of the coherent energy illuminating mask 132.

Referring back to FIG. 1, each of respective pinholes of matrix mask 132 acts as an individual source of mutually coherent wave energy. Emanating from each individual source is an individual divergent beam 134 of coherent wave energy. The degree of divergence is determined by the angle of diffraction of each individual one of pinholes 200 of mask 132. This angle of diffraction will be discussed in more detail below. All that need be said now is that the angle of diffraction and hence the divergence of each of beams 134 increases as the size of the pinhole dimension $a$ decreases.

As shown in FIG. 1, the various divergent beams 134 of coherent wave energy cross over each other as they travel away from matrix mask 132. However, because they are mutually coherent, the various crossing diverging beams 134 will interfere with each other to provide a spatial distribution of first regions of relative constructive interference separated by second regions of relative destructive interference. This spatial distribution is determined by such factors as the wavefront and wavelength of the coherent wave energy illuminating point source matrix 132, the total number of pinholes in the array and the pattern formed thereby, and the distance $d$ between adjacent pinholes of the array relative to both the wavelength of the coherent wave energy and the dimensions, such as $a$, of each pinhole. In any given case, all these factors are predetermined to provide a desired redundancy. As will be explained later, this requires a relatively large ratio of $(d/a)$ and a relatively large $d$ which in itself cannot provide a sufficiently high resolution capability. However, since the density and shape of the first regions in any local grouping of this spatial distribution are not uniform, but vary as a function of the distance of that local grouping from individual sources matrix mask 132, both the required redundancy and resolution may simultaneously be obtained by properly selecting the distance from the mask to the object.

In particular, an object consisting of transparency 136, which may be a frame of a motion picture for instance, is located, as shown, at a selected distance S from point source matrix mask 132. The distance S is selected, in a manner to be described below, so that transparency 136 is located wholly within the interior of a particular local grouping of first regions of constructive interference and is, therefore, illuminated only by coherent wave energy of the first regions of this particular local grouping.

The selected distance S is made such that the spacing between any pair of adjacent ones of the first regions of the particular local grouping illuminating transparency 136 is sufficiently smaller than the spacing $d$ between adjacent pinholes of matrix mask 132 to result in transparency 136 being sampled by the coherent energy illuminating it with a resolution at least adequate to provide the required resolution limit, despite the fact that the distance $d$ necessary to provide the required redundancy is in itself too large to accomplish this. This results in the coherent energy of each first region of the particular local grouping illuminating the transparency being modulated by that sample portion of the object information depicted by the transparency which it illuminates.

It is also desirable that the selected distance S be such that any noise interference projected on transparency 136 due to constructive and destructive interference among the beams 134 has no spatial frequency components below the required resolution limit, so that this noise interference cannot be resolved.

A projection lens having a focal length $f$ is situated, as shown, so that transparency 136 is located on one side of lens 138 in one focal plane thereof, while hologram recording medium 130 is located on the other side of lens 138 preferably near the other focal plane thereof. It will be seen that lens 138 transforms the various diffraction orders of the modulated coherent wave energy emanating from each respective sample portion of transparency 136, such as modulated beam 140 into a component of parallel beam 142 which illuminates a given area of hologram recording medium 130 simultaneously with the illumination of this same given area by reference beam 122. This results in the recording of a hologram with a given redundancy, which hologram can be reconstructed with some certain given resolution limit that is sufficient to preserve the object information detail in transparency 136 without at the same time permitting any extraneous, spurious noise interference patterns to be resolved.

From the foregoing discussion, it is clear that the practice of the present invention depends upon the proper choice of the dimensions $a$ and $d$ of the point source matrix mask 132, as well as the proper choice of the distance S between the point source matrix and the transparency. These will now be discussed.

In accordance with known principles of diffraction, when a pinhole having the dimension $a$ is illuminated with a plane wavefront of given wavelength, 84% of the energy in the diffracted diverging wave emerging from the pinhole is contained within a circle, known as the Airy disk, which subtends an overall angle $\theta_a$ defined by the following equation:

(1) $\theta_a = 2 \arcsin(1.22\lambda/a)$ where $\lambda$ is the given wavelength.

Furthermore, in accordance with the principles of diffraction, an array of spaced pinholes, such as shown in FIG. 2, with a spacing between adjacent pinholes of $d$, results in the generation of a zero diffraction order plus one or more pairs of higher diffraction orders having an angular spacing between successive orders defined by the following equation:

(2) $\theta_d = \arcsin(\lambda/d)$

The total number N, of orders that are generated by each pinhole of such an array, including the zero order and each of all included pairs of higher orders, is defined by the following approximate equation which relates equations (1) and (2) when $\theta_a$ and $\theta_d$ are small:

(3a) $$N_1 \cong \frac{\pi \left(\frac{\theta_a}{2}\right)^2}{(\theta_d)^2} \cong \pi \left(1.22 \frac{d}{a}\right)^2$$

The number $N_2$ of orders incident on the recording area of the medium of FIG. 1 is limited by the dimensions thereof. Assuming a circular recording area of diameter D, for example, $N_2$ is defined by the following approximate equation:

(3b) $$N_2 \cong \pi \left(\frac{D}{2f\theta_d}\right)^2 \cong \pi \left(\frac{Dd}{2f\lambda}\right)^2$$

in which a minimum $f$ is determined by other system parameters, such as object size and limiting resolution of the recording medium, and D and $\lambda$ are fixed.

Redundancy is a direct function of the smaller of $N_1$ and $N_2$. Therefore, as indicated by equations 3a and 3b, to obtain a relatively high redundancy, it is necessary that the ratio $(d/a)$, and the spacing $d$, be relatively large. In principle, $a$ can be made extremely small, but increasing the value of $d$ of the pinhole array has the tendency or reducing of resolution with which object information in a transparency may be sampled. This tendency is overcome in the present invention by properly selecting the distance S, shown in FIG. 1, between the matrix mask and the transparency.

As explained earlier, the diffraction pattern of a matrix of point sources will result in a spatial distribution of first regions of relative constructive interference separated by second regions of relative destructive interference. In the case of a square array of pinholes, such as shown in FIG. 2, the diffraction pattern consists of various periodically occurring, regular patterns that depend on the shape and wavelength of the coherent wavefront illuminating the matrix of point sources and on the distance S from the matrix to the particular regular pattern in question. In particular, at periodically occuring, predetermined values of the distance S, the first regions form a pattern of small spots arranged in a pattern with the original $d \times d$ spacing of the pinhole array itself. These predetermined values of the distance S are given by the following equation when the matrix is illuminated with a plane wave:

(4) $S = n(d^2/\lambda)$, where $n$ is any integer.

In the space interval between successive ones of these predetermined values defined by equation (4), other regular patterns with closer spacings between first regions of constructive interference occur. For instance, at certain values of S, which occur intermediate each pair successive ones of these predetermined values thereof, the first regions also form a pattern of spaced small spots, but in this case the spacing between spots is closer, being $(d/m) \times (d/m)$ (rather than $d \times d$), where $m$ is any integer greater than 1. The respective values of the selected distance S at which these $(d/m) \times (d/m)$ patterns are formed is defined by the following equation:

(5) $$S = \frac{d^2}{\lambda}\left(n \pm \frac{1}{m}\right)$$

At values of the selected distance S other than those defined by equations (4) or (5) a regular pattern of first regions of constructive interference separated by second regions of destructive interference is also formed, but, in these latter cases, the shape of the respective first regions and/or their arrangement within the pattern may be more complex. Therefore, it is not feasible to define these complex patterns by simple equations, such as equations (4) and (5). However, as will be explained in more detail below, there is an empirical method for selecting the value of distance S to provide the required relatively high resolution, as well as the required high redundancy for these complex pattern cases and also for those cases in which the selected distance may be defined by equation 5.

From the foregoing discussion, it is clear that the selected distance S may be chosen within a space interval defined by any pair of successive values of the integer n whatsoever. However, it is preferable, although not required, that the selected value of the distance S be large enough to satisfy the following equation:

(6) $S \gg (ad/\lambda)$.

The reason it is desirable that the selected value of the distance S satisfy equation (6) is that each first region of constructive interference will then be the resultant of coherent energy components which have originated from many, if not all, pinholes in the original array. Therefore, imperfections in the array due to defects in the physical matrix mask, which are inevitable in actual practice, tend to cancel out. On the other hand, it is not desirable to select the value of the distance S so large that the total area of illumination by the diffracted coherent wave energy in the plane of the transparency is significantly larger than the area of the transparency itself, since this would result in the waste of much of the available coherent wave energy.

In practice, the ratio of $(d/a)$ of the pinhole array should really be at least five and, preferably, ought to be at least ten. Furthermore, the value of $a$ should be chosen in accordance with equation (1) to provide a divergent angle which subtends an area in the plane of the transparency that is only slightly larger than the area of the transparency itself. This optimises the use of the available coherent wave energy for illuminating the transparency. In practice, a larger $a$ or smaller S may be used for convenience, with good results.

By way of example, a matrix mask may be formed by etching a predetermined array of pinholes in a chrome deposit on glass. Alternatively, self-supporting matrix masks, consisting of a predetermined pinhole array in thin metal without a glass substrate may also be used.

The size $a$ of each pinhole in the array is typically between 3 and 10 microns, while the distance $d$ between adjacent pinholes in the array is typically between 30 and 100 microns. The wavelength $\lambda$ of laser light employed is normally in the visible range and is preferably in the shorter wavelength (blue) portion of the spectrum.

In one actual case, which is given only by way of example, the dimension of each pinhole $a$ was 7 microns; the distance $d$ between adjacent pinholes was 76.2 microns, while the matrix mask was illuminated with a plane wavefront of coherent light having a wavelength of 4,416 Angstroms. The overall pinhole array was in the form of a square having dimensions of approximately ½ × ½ inches. The transparency was a frame of a 16 mm. film, the active area of which had dimensions of 7 ½ × 10 mm.

One way, of course, to properly adjust the distance S between the matrix mask and the transparency would be to utilize equation (5), employing some value of $m$, such as 3, 4 or 5 for instance, and a value of $n$ which provides a value of S of approximately 2 cm. In this case, the actual distance S can be adjusted to equal the computed value thereof. However, it has been found that in practice it is more feasible to imploy an empirical method for selecting the particular distance S which produces the best results.

In particular, in accordance with such an empirical method, individual sources matrix mask 132 is initially spaced from transparency 136 by an amount, such as 2 cm., which conforms with the constraint of equation (6), discussed above. Matrix mask 132 is illuminated with plane wavefront 112, resulting in transparency 136 being illuminated with coherent wave energy from beams 134. Then a projection lens, which may be projection lens 138 or may be another projection lens, not shown, with a different focal length, is adjusted in the path of the modulated coherent wave energy emerging from transparency 136 to focus an image of transparency 136 on a screen or, in the alternative, on the photosensitive element of a television pick-up tube of a closed circuit television system, which displays an image of the object on the kinescope of the television receiver of the system. The displayed image, whether on a screen or on the kinescope of a closed circuit television system, is visually observed by a viewer, who then manually makes whatever fine adjustment of the distance S between matrix mask 132 and transparency 136 is necessary in order to maximize the resolution of the obtained image of the object information consistent with avoiding the appearance of any noise interference pattern in the observed image. The value of the distance S thus obtained is the proper selected value thereof.

If a particular, known sampling rate of the object is required, which may not coincide with the "maximized" image obtained above, the equation (5) should be used. Final adjustment of S can be made by viewing the object plane under high magnification, as with a microscope for example, to examine the actual spacing $(d/m)$.

After the proper value of the distance S has been selected, projection lens 138 and hologram recording medium 130 are situated as shown in FIG. 1 to permit the recording of a Fraunhofer hologram having a high degree of redundancy. When the recorded hologram is reconstructed, in a manner known in the art, the resulting reconstructed image will not only have a desired high resolution, but it will not contain observable speckle noise or other noise interference patterns.

FIG. 3 shows a first alternative embodiment of the present invention. In particular, a single point source of coherent wave energy from a coherent source, not shown, is produced by lens 300 and pinhole plate 302 having a single pinhole therein. Emerging from pinhole plate 302 is diverging beam 304 coherent wave energy. Beam 304 illuminates a pinhole array mask 306, which is similar to that shown in FIG. 2. Pinhole array mask 306 is located as shown in the focal plane of convex lens 308. Lens 308 is illuminated by each of the diverging sub-beams 310 emanating from each respective pinhole of pinhole array mask 306. Sub-beams 310 are refracted by lens 308 to form a plurality of sub-beams 312, corresponding to different diffraction orders.

In crossover plane 314, which corresponds to the image plane of pinhole plate 302, the zero diffraction order from each of the pinholes of pinhole array mask 306 will converge at the intersection os symmetry axis 316 and crossover plane 314. Corresponding ones of each pair of higher orders will also converge to a respective point in crossover plane 314. However, as indicated in FIG. 3, the point of convergence of each one of every respective pair of higher orders (only one of which is shown) is displaced from symmetry axis 316 by an amount which depends upon the ordinal value of that order.

Since the undiffracted light, manifested by the zero order, may be relatively brighter than the higher orders, it is often objectionable. Therefore, spatial filter 318, formed by a small opaque element, is situated at the intersection of crossover plane 314 and symmetry axis 316 to thereby intercept the converging zero order. However, the higher orders are displaced in crossover plane 314 by a sufficient amount to avoid being intercepted by spatial filter 318. This displacement is shown, for the sake of clarity, exaggerated in FIG. 3. Furthermore, if spatial filter 318 consists of fine holes that transmit only the focused points due to the diffraction orders of the matrix, with or without the zero order, it will have the effect of improving the results of this invention by eliminating unwanted information in the light beams as is well known. If the original matrix and associated optics are of sufficiently high quality, spatial filter 318 may be omitted as in FIG. 1.

Convex lens 320 having a focal length $f_2$, is located, as shown, a distance equal to $f_2$ beyond crossover plane 314, so that crossover 314 lies in one focal plane of lens 320. All the coherent light energy manifesting each one of the respective higher orders of diffraction gives rise to a separate diverging beam of coherent wave energy, such as coherent wave energy beam 322 (which for the sake of clarity is the only one shown). All of these separate diverging beams, such as beam 322, is incident on lens 320 to thereby form a corresponding plane wavefront composed of parallel arrays of coherent wave energy, such as coherent wave energy beam 324, for each one of the separate originating higher diffraction orders. The angular orientation of the parallel rays of beam 324 are offset from symmetry axis 316. The amount and direction of this angular offset is determined by the relative position in crossover plane 314, with respect to the axis of symmetry 316, of the particular diffraction order from which beam 324 has been derived. Thus, each individual diffraction order will give rise to a beam of parallel rays having its own individual direction with respect to the direction of symmetry axis 316.

As indicated in FIG. 3, lens 320 will form an image of pinhole array 306 located in focal plane 326 of lens 320. The image of pinhole array 306 in focal plane 326 constitutes an effective pinhole array matrix of point sources. Located beyond focal plane 326 a selected distance (corresponding to distance S of FIG. 1) is object 328, which may be a transparency. Object 328 is illuminated by a coherent wave energy from the matrix of individual sources defined by the image of the pinhole array in focal plane 326. This results in the derivation of modulated coherent wave energy 330 which contains object information with a given redundancy and a given resolution, as described in detail in connection with FIG. 1. Projection lens 332 is situated to focus an image of object 328 on a given area of medium 334 with this given resolution limit and given redundancy.

Referring now to FIG. 4, there is shown as a second alternative embodiment an arrangement similar to that of FIG. 3, except that only a single lens is employed for obtaining an image of the pinhole array array and illuminating object 400. In particular, pinhole plate 402 is located in a first object plane of convex lens 404, which produces an image thereof in crossover plane 406. The spatial filter is located in the crossover plane, in the same manner as described in connection with FIG. 3. In FIG. 4, pinhole array mask 408 is located in a second object plane of lens 404 to produce an image of pinhole array 408 in plane 410. Also, in FIG. 4, the image of pinhole array 408 in plane 410 constitutes the point source matrix. However, in this case the wavefront of the coherent wave energy effectively illuminating the point source matrix defined by the image of pinhole array 406 in plane 410 is not a plane wave, as is the case in each of FIGS. 1 and 3, but is a diverging wave. However, object 400 is situated a selected distance, corresponding to distance S in FIG. 1, from this effective point source matrix to produce a modulated diverging beam of coherent energy 412 which contains the object information with the required given redundancy and given resolution limit. Projection lens 414 projects an image of the object on medium 416 and in the same manner described in connection with projection lens 332 and medium 334 of FIG. 3.

Although not specifically shown, it will be seen that the spatial filter together with either the double lens system of FIG. 3 or the single lens system of FIG. 4 may be employed to illuminate the transparency in FIG. 1. Also, the projection lens of the type employed in either FIG. 3 or FIG. 4 may be substituted in FIG. 1 for projecting a focused image of the object on the hologram recording medium or on any other medium, including a television pickup tube or a viewing screen. Thus, the teachings of the present invention as illustrated in the specific arrangements of FIGS. 1, 3 and 4 may be practiced in other arrangements than those specifically shown.

What is claimed is:

1. Apparatus employing coherent wave energy to illuminate a non-scattering object and to project with a given resolution limit and a given redundancy object-information obtained thereby on a given area of a medium, said apparatus comprising:

first means including a wave diffracting member responsive to illumination thereof by an applied given wavefront of coherent wave energy of a preselected wavelength for simultaneously deriving a predetermined matrix of a given number of individual sources of said coherent wave energy arranged in a first given pattern with at least a minimum spacing between any pair of adjacent sources, said minimum spacing being chosen to limit the diffraction by said matrix to an amount which provides an inherent redundancy capability at least equal to said given redundancy but results in the inherent resolution capability of said matrix itself being significantly smaller than said given resolution limit, whereby when said diffraction member is illuminated by said given wavefront of said coherent energy the coherent energy emanating from each respective one of said individual sources interferes with the coherent wave energy emanating from others of said individual sources to provide a spatial distribution of first regions of relative constructive interference separated by second regions of relative destructive interference, the density of any local grouping of said first regions in said distribution being a function of said given wavefront, said preselected wavelength, said given number, said first given pattern, and the location of said local grouping with respect to said matrix;

said object being in a given spaced relationship with respect to said matrix which is selected to illuminate said object with the coherent wave energy of at least some of said first regions of only a particular local grouping, said first region of said particular local grouping being arranged in a second pattern characterized by having a given density of said first regions such that the spacing between any pair of adjacent ones of said first regions of said particular local grouping is sufficiently smaller than said minimum spacing of said sources of said first pattern to result in said object being sampled by coherent energy of said particular local grouping with a resolution at least equal to said given resolution limit, whereby the coherent energy of each first region of said particular local grouping illuminating said object is modulated by that sample portion of said object which it illuminates, and wherein any noise interference portion of said second pattern projected on said object, which noise interference portion is due to constructive and destructive interference among the individual sources of said wave diffracting member, has no spatial frequency components below said given resolution limit, and second means including said medium arranged to illuminate said medium within said given area thereof simultaneously with at least part of each of a given plurality of diffraction orders of the modulated coherent wave energy emanating from each respective sample portion of said object, said given plurality being sufficient to provide said given redundancy.

2. The apparatus defined in claim 1, wherein said medium is a recording medium capable after recording of reconstructing an image of said object with a certain predetermined ultimate resolution limit which is no greater than said given resolution limit.

3. The apparatus defined in claim 2, further including third means for illuminating said entire given area of said medium with a reference beam of said coherent wave energy simultaneously with the illumination thereof with all of said diffraction orders of said modulated coherent wave energy, wherein said reference beam arriving at said medium is angularly displaced with respect to each respective one of said diffraction orders arriving at said medium, whereby a hologram of said object is recorded on said recording medium with said given redundancy and said given resolution limit.

4. The apparatus defined in claim 1, wherein said first means derives a predetermined matrix in which said first given pattern is a regular pattern of a predetermined number of sources with the spacing between any pair of adjacent sources being substantially the same, and wherein said given spaced relationship is selected to provide a regular second pattern in which said first regions of said particular local grouping are concentrated into spaced spots substantially equal in number to a multiple of said predetermined number with the spacing between any pair of adjacent spots in said second pattern being a sub-multiple of the spacing between any pair of adjacent sources in said first pattern.

5. The apparatus defined in claim 1, wherein said diffracting member is a pinhole array arranged in said first given pattern, and wherein each separate pinhole of said array corresponds with a different individual source of said matrix.

6. The apparatus defined in claim 5, wherein the respective pinholes of said array each have given dimensions and wherein adjacent pinholes of said array are spaced a given distance from each other, the value of said given dimensions being selected to provide an angle of diffraction sufficient in size to spread the coherent light emanating from any pinhole of said array over substantially said entire area of said medium and said given distance being chosen to provide at least said given plurality of diffraction orders within said angle of diffraction.

7. The apparatus defined in claim 6, wherein said coherent wave energy is light wave energy, wherein said given dimensions are no greater than 10 microns, and wherein said given distance is at least 5 times as large as said given dimensions.

8. The apparatus defined in claim 7, wherein said given distance is at least ten time said given dimensions.

9. The apparatus defined in claim 1, wherein the given spaced relationship between said matrix and said object is sufficiently great to result in the coherent wave energy contributing to each one of said first regions of said particular local grouping having originated from many of said sources.

10. The apparatus defined in claim 9, wherein said object is a transparency having certain dimensions, and wherein said given spacing relationship between said matrix and said object is such that said particular local grouping is distributed over an area having dimensions only slightly larger than the certain dimensions of said transparency with said transparency being located wholly within the interior of said particular local grouping area.

11. The apparatus defined in claim 1, wherein said object is spaced a selected distance from said matrix, said selected distance being such that any relative movement between said object and said matrix from said selected distance which either reduces or increases the distance therebetween results in a reduction in redundancy or a decrease in resolution from said given resolution limit or a decrease in any spatial frequency component of any noise interference portion of said second pattern below said given resolution limit, whereby said given redundancy obtained at said selected distance is optimized.

12. The apparatus defined in claim 1, wherein said second means includes a projection lens for projecting said given plurality of diffraction orders of the modulated coherent wave energy emanating from each respective sample portion of said object on said medium within said given area.

13. The apparatus defined in claim 12, wherein said projection lens has a given focal length, said projection lens being positioned intermediate said object and said medium to focus a real image of said object in a given image plane, said medium being oriented with said given area thereof in coincidence with said image plane.

14. The apparatus defined in claim 12, wherein said projection lens has a given focal length, said projection lens being positioned intermediate said object and said medium with said object lying in a focal plane of said lens to thereby project a collimated beam comprising said diffraction orders in said medium within said given area.

15. The apparatus defined in claim 1, wherein said diffracting member comprises a pinhole array and wherein said first means further includes convergent lens means oriented in cooperative relationship with said pinhole array for converging the coherent energy emanating from said pinhole array to crossover in a crossover plane and then to focus an image of said pinhole array in a pinhole-array image plane, and a spatial filter situated in said crossover plane for intercepting the zero order of diffraction of coherent energy from said pinhole array and permitting solely the higher orders of diffraction of coherent energy from said pinhole array to arrive at said image plane, said matrix of point sources being formed by the coherent energy arriving in said image plane.

16. The apparatus defined in claim 15, wherein said lens means includes a first lens having a first given focal length and a second given lens having a second given focal length, said pinhole array being located in a focal plane of said first lens and being illuminated with coherent wave energy having a predetermined degree of divergence to result in coherent wave energy passing through said pinhole array and illuminating said first lens converging and crossing over in a crossover plane located a first certain distance from said first lens on the other side thereof from said pinhole array, said spatial filter being located in said crossover plane in cooperative relationship with said orders of diffraction to pass solely said higher orders, said second lens being situated relative to said first lens beyond said crossover plane by an amount equal to said second focal length, whereby said image of said pinhole array forming said matrix is located in the focal plane of said second lens situated on the other side thereof from said crossover plane.

17. The apparatus defined in claim 15, wherein said lens means includes a single lens having a given focal length, said pinhole array being located on one side of said lens at a given distance therefrom which is greater than said focal length and being illuminated with coherent wave energy having a predetermined degree of divergence to result in coherent wave energy passing through said pinhole array and illuminating said lens converging and crossing over in a crossover plane and then being focused into an image of said pinhole array forming said matrix, said matrix being located in an image plane with respect to said lens a certain distance beyond said crossover plane, said spatial filter being located in said crossover plane in cooperative relationship with said diffraction orders to pass solely said higher orders.

18. Apparatus for recording a hologram of a non-scattering object on a recording medium, said hologram being capable of reconstruction with a given resolution limit, comprising:
 a multiplicity of spaced sources of mutually coherent wave energy arranged in a given matrix pattern having a relatively coarse structure sufficient to provide a given redundancy but insufficient to directly sample said object with a resolution at least equal to said given resolution limit,
 the sizes of said sources and the spacings between said sources being selected to provide a particular composite wave energy distribution within a given volume of space in proximity to said sources,
 the distribution of said wave energy within a selected region of said volume spaced a predetermined distance from said matrix pattern forming a first interference pattern having a structure which is relatively fine in comparison with that of said matrix pattern, and
 means for positioning said object within said region at said predetermined distance from said matrix pattern, so that said object is illuminated by and spatially modulates the wave energy of said finely structured interference pattern, said interference pattern being sufficiently fine to sample said object with a resolution at least equal to said given resolution limit,
 means for positioning said recording medium in cooperative relationship to said object so that the spatially modulated wave energy emanating from said object illuminates a given area of said recording medium, and
 means for simultaneously illuminating said recording medium with a reference beam of coherent wave energy which is mutually coherent with said spaced sources and angularly displaced with respect to said spatially modulated wave energy, to form on said medium in cooperation with said spatially modulated wave energy a second interference pattern corresponding to said hologram.

* * * * *

UNITED STATES PATENT OFFICE
CERTIFICATE OF CORRECTION

PATENT NO. : 3,689,129
DATED : Sept. 5, 1972
INVENTOR(S) : Michael Jay Lurie

It is certified that error appears in the above-identified patent and that said Letters Patent are hereby corrected as shown below:

On title sheet, the "Assignee: RCA Corporation" has been omitted.

Signed and Sealed this

Twenty-third Day of November 1976

[SEAL]

Attest:

RUTH C. MASON
*Attesting Officer*

C. MARSHALL DANN
*Commissioner of Patents and Trademarks*